United States Patent
Hoeft et al.

(10) Patent No.: US 6,556,411 B1
(45) Date of Patent: Apr. 29, 2003

(54) PURGE PROTECTION CARTRIDGE WITH THREE-WAY ATTACHMENT CLIP

(75) Inventors: Daniel Hoeft, Niles, IL (US); Dominic Morrone, Berwyn, IL (US); Albert McGovern, Naperville, IL (US); Thomas Baum, Naperville, IL (US)

(73) Assignee: Marconi Communications, Inc., Cleveland, OH (US)

( * ) Notice: Subject to any disclaimer, the term of this patent is extended or adjusted under 35 U.S.C. 154(b) by 0 days.

(21) Appl. No.: 10/114,145

(22) Filed: Apr. 2, 2002

(51) Int. Cl.⁷ .............................. H20H 1/00; H20H 1/04; H01R 4/66; H01R 13/66; H01R 33/945
(52) U.S. Cl. .................... 361/119; 439/92; 439/620
(58) Field of Search .................... 439/92, 435, 444, 439/858, 620; 361/119; 337/283

(56) References Cited

U.S. PATENT DOCUMENTS

| | | | |
|---|---|---|---|
| 4,504,883 A | 3/1985 | Uchida et al. ............. 361/119 |
| 4,758,921 A | * 7/1988 | Hung ....................... 361/119 |
| 5,574,614 A | 11/1996 | Busse et al. .............. 361/119 |
| 5,595,507 A | 1/1997 | Braun et al. .............. 439/716 |
| 5,596,473 A | 1/1997 | Johnson et al. ........... 361/97 |
| 5,627,721 A | * 5/1997 | Figueiredo et al. ....... 361/119 |
| 5,643,014 A | 7/1997 | Filus et al. ............... 439/680 |
| 5,696,820 A | * 12/1997 | Pelegris et al. ........ 379/413.04 |
| 5,779,504 A | 7/1998 | Dominiak et al. ........ 439/709 |
| 5,844,785 A | 12/1998 | Daoud et al. ............. 361/824 |
| 5,923,238 A | 7/1999 | Polzehl et al. ............ 337/283 |
| D424,022 S | 5/2000 | Polzehl .................... D13/178 |
| 6,101,079 A | * 8/2000 | Viklund .................... 361/119 |
| 6,166,894 A | 12/2000 | Kane ........................ 361/119 |
| 6,215,638 B1 | 4/2001 | Figueiredo et al. ....... 361/119 |
| 6,243,250 B1 | * 6/2001 | Cater ....................... 361/119 |
| 6,247,959 B1 | 6/2001 | Daoud et al. ............. 439/409 |
| 6,249,415 B1 | 6/2001 | Daoud et al. ............. 361/117 |

FOREIGN PATENT DOCUMENTS

EP          0753907       1/1997       ........ H01R/13/66

* cited by examiner

Primary Examiner—Lynn D. Feild
Assistant Examiner—Chandrika Prasad
(74) Attorney, Agent, or Firm—Jones, Day, Reavis and Pogue

(57) ABSTRACT

A surge protection cartridge is disclosed which is compact, allows for surge protection devices to be inserted and removed by hand, is rugged, is easy to use and is economical. The cartridge includes a plastic housing, a series of tip and ring terminals mounted to the housing, a ground bar mounted within the housing, a guide strip frictionally mounted to the housing, two attachment clips and a cover. The guide strip is partitioned and includes surge protection device pads with three holes and funnel-like bordering surfaces around each hole to facilitate installation of the devices. The side walls of the housing are shortened to allow hand installation and removal of devices and the cover is used to protect the devices and maintain their connection even when the cartridge is roughly handled. The attachment clips connect to the housing, to a standard telecommunication frame and to a modular terminal block assembly.

18 Claims, 9 Drawing Sheets

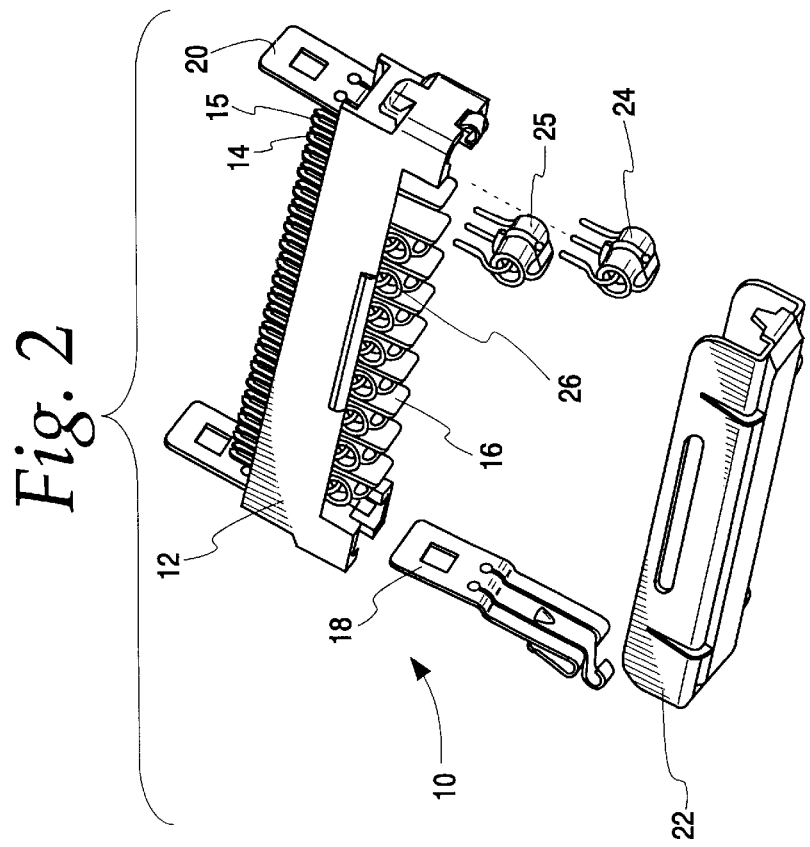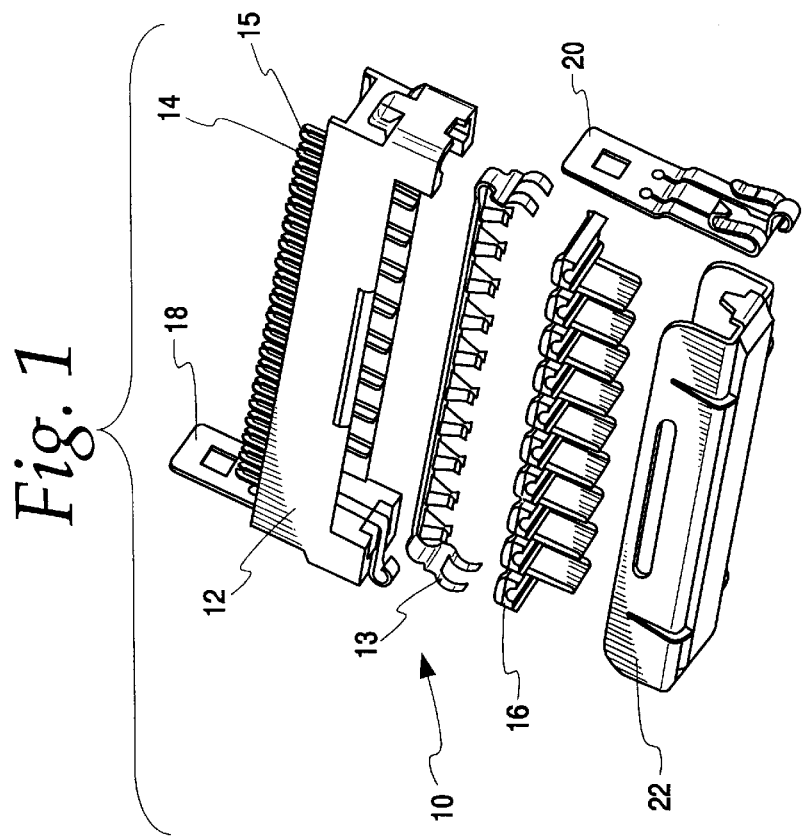

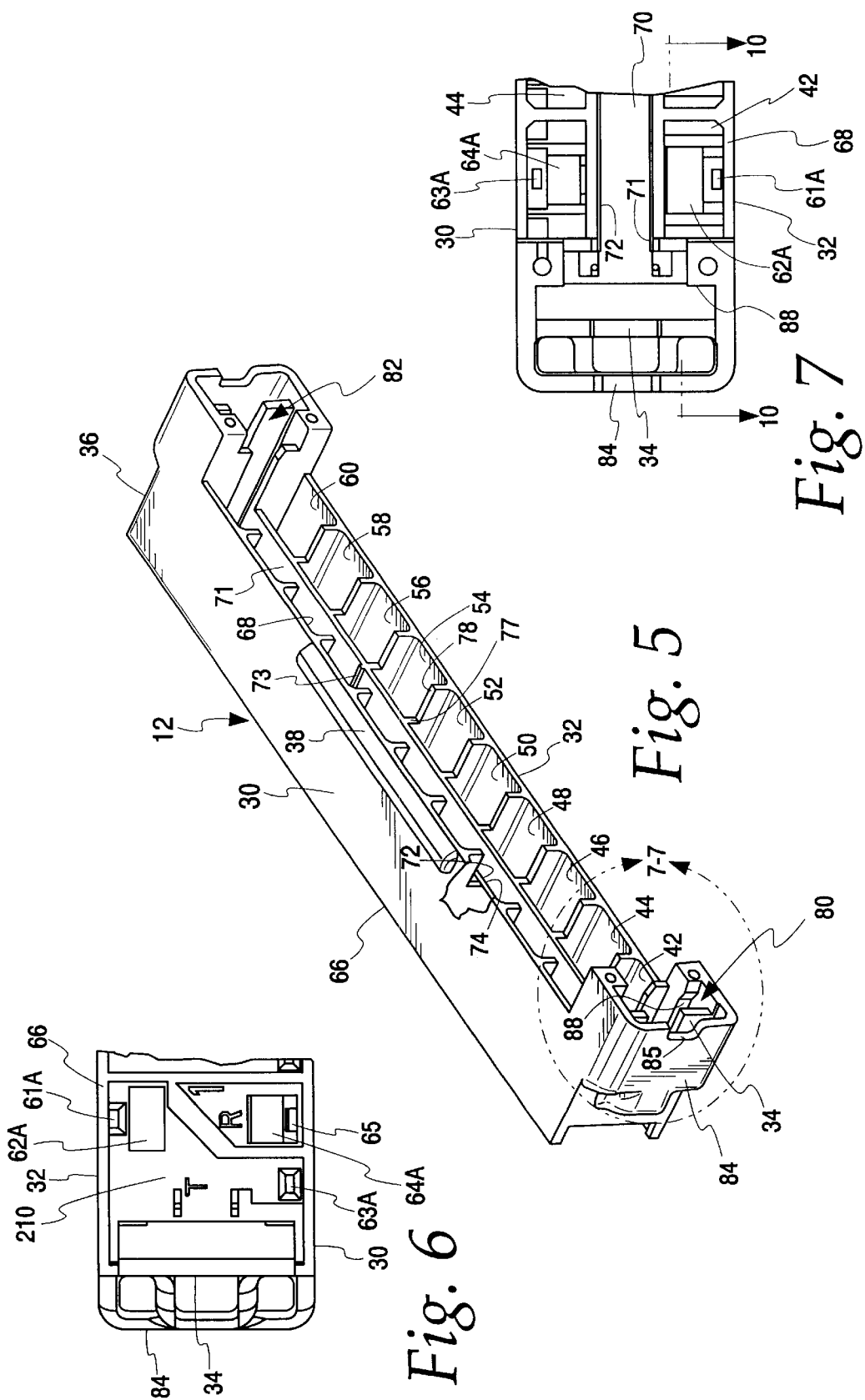

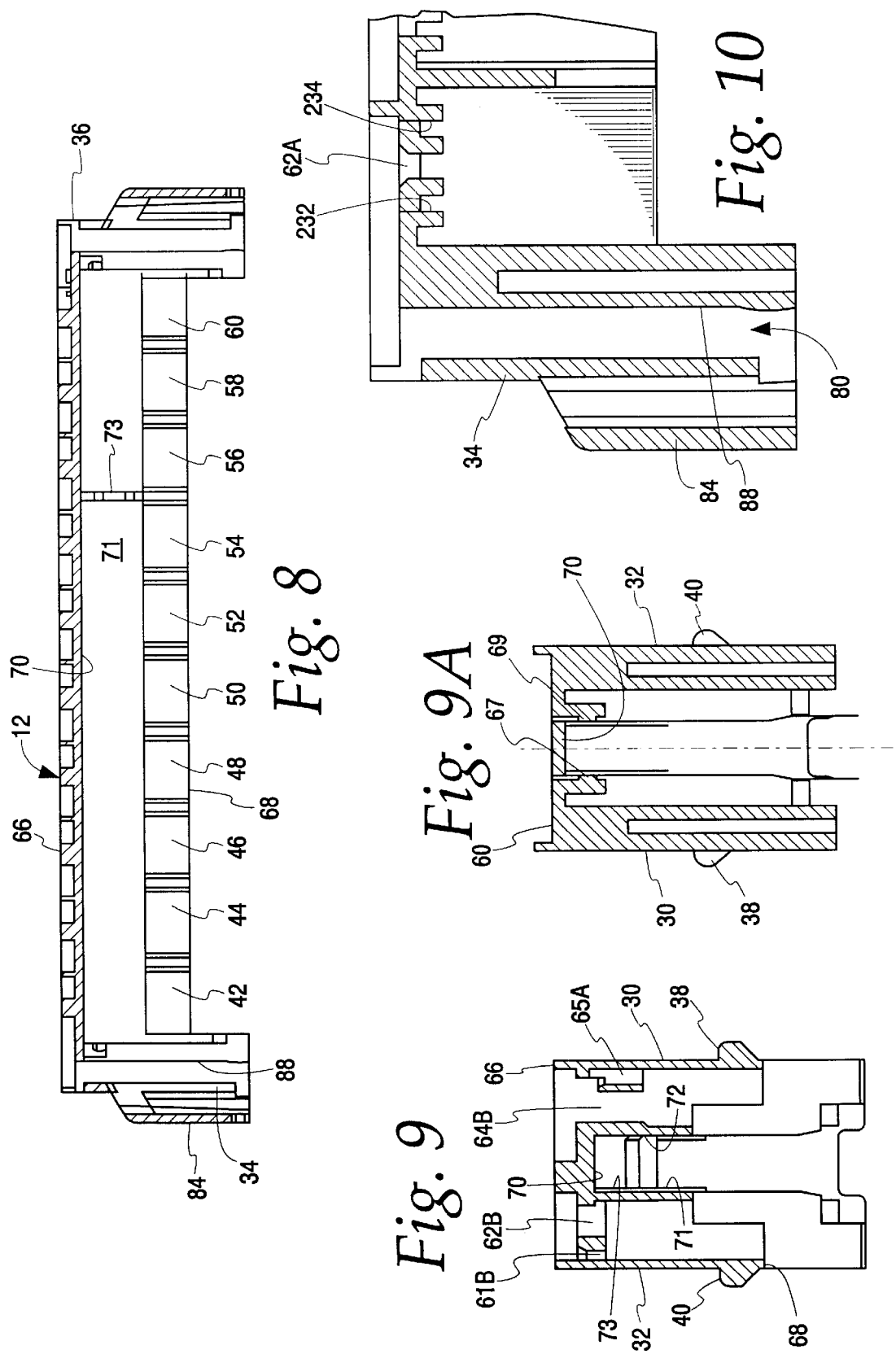

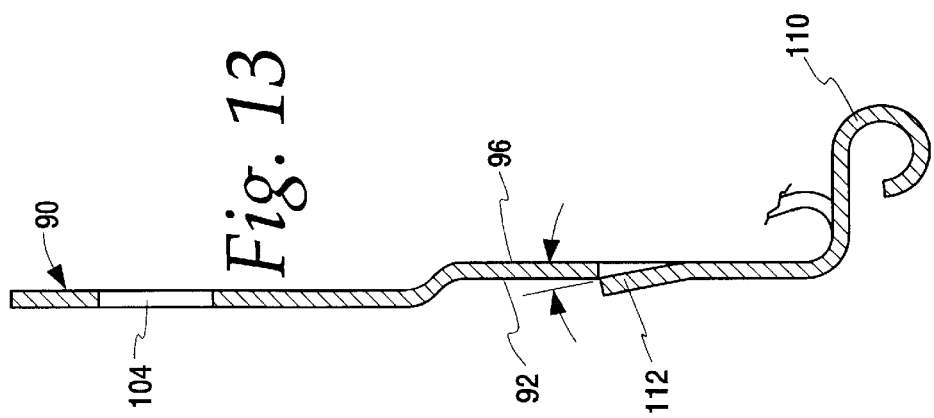
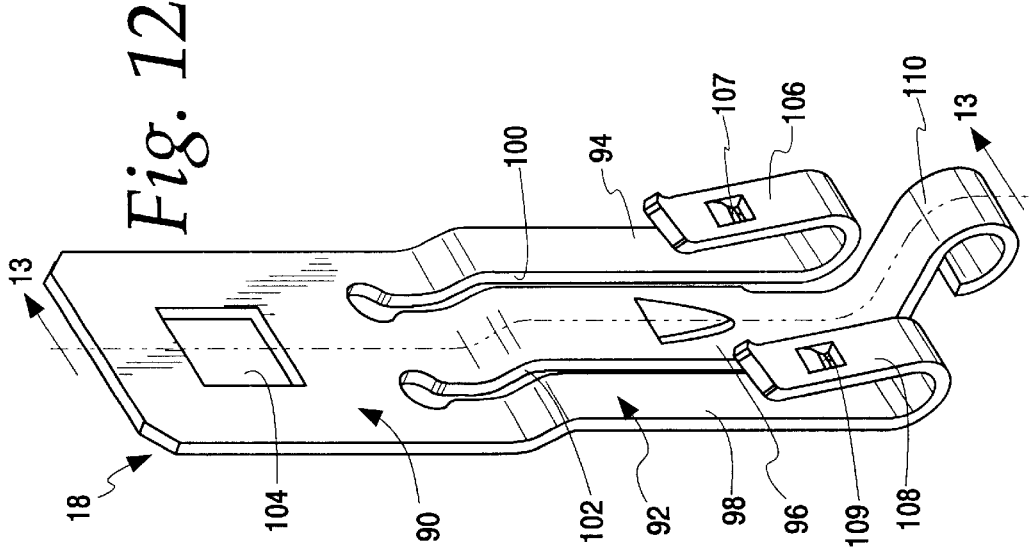
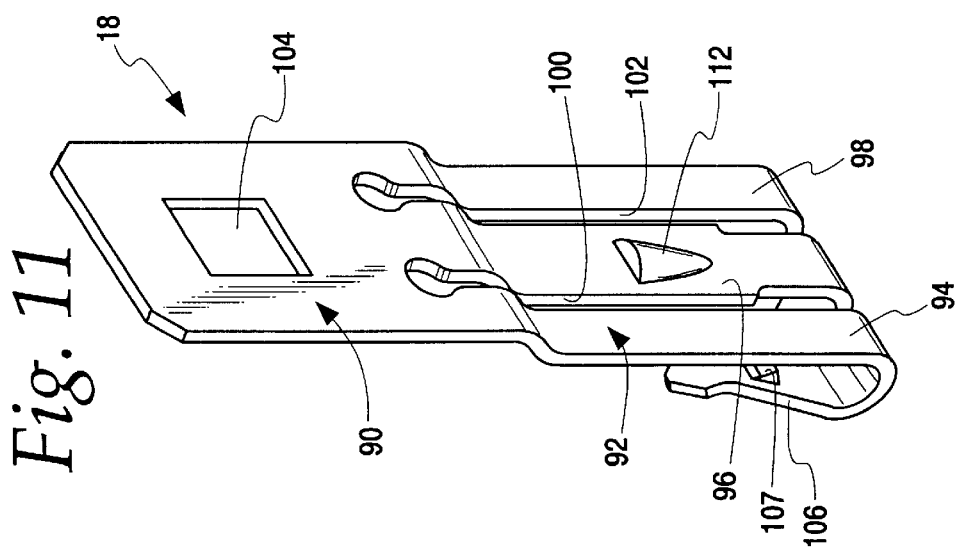

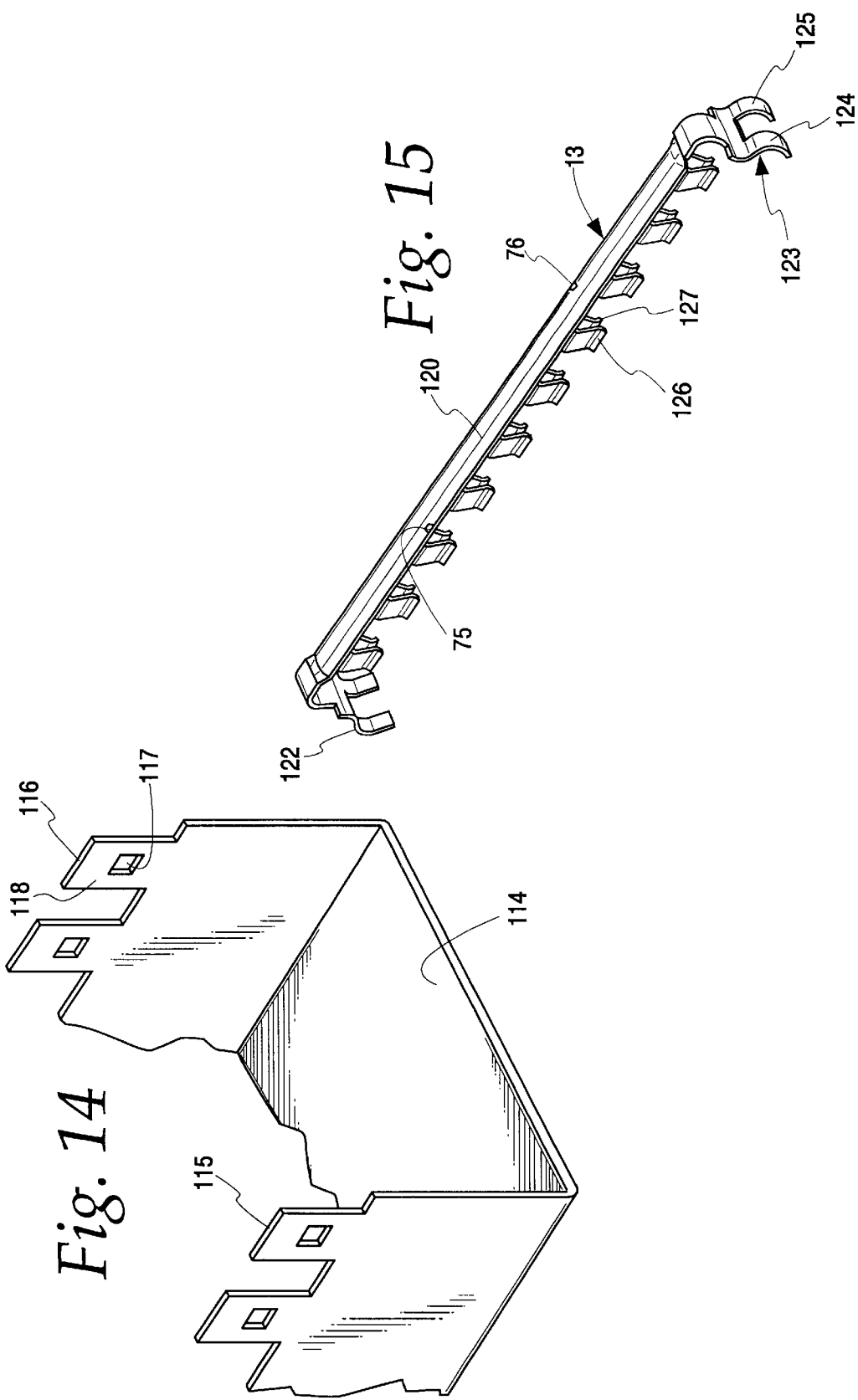

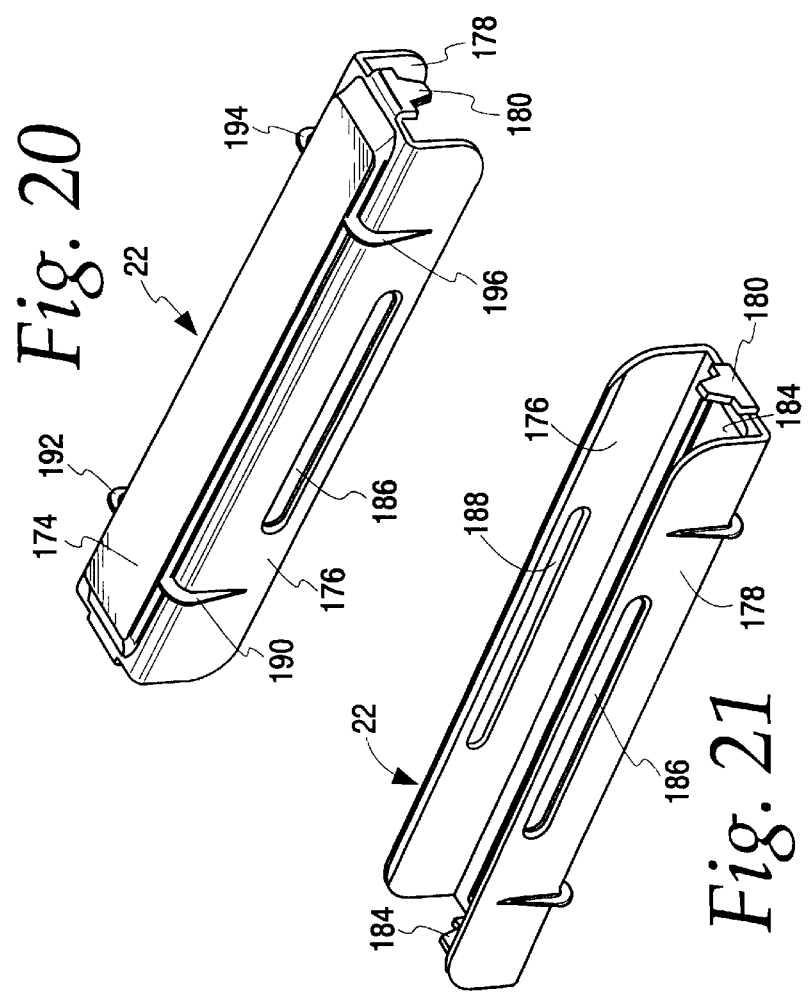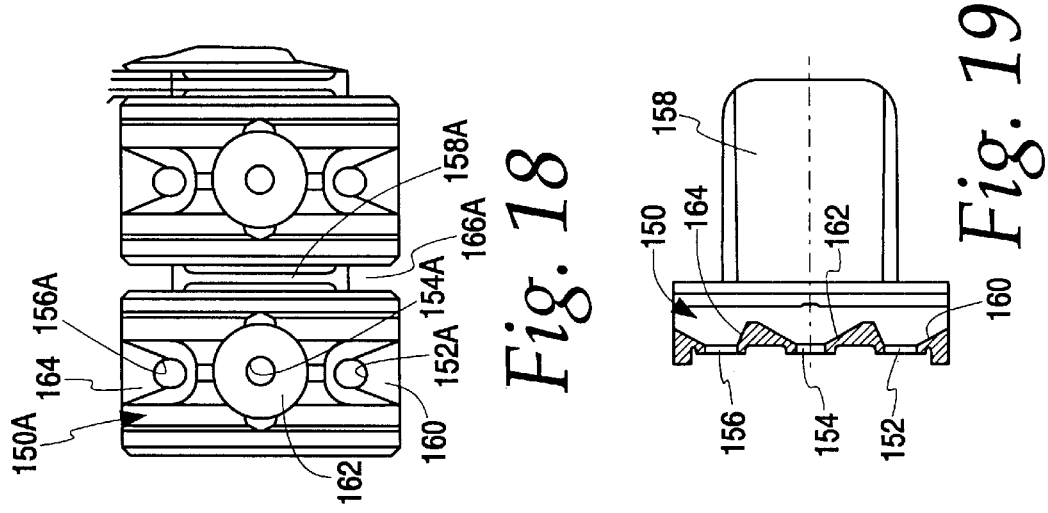

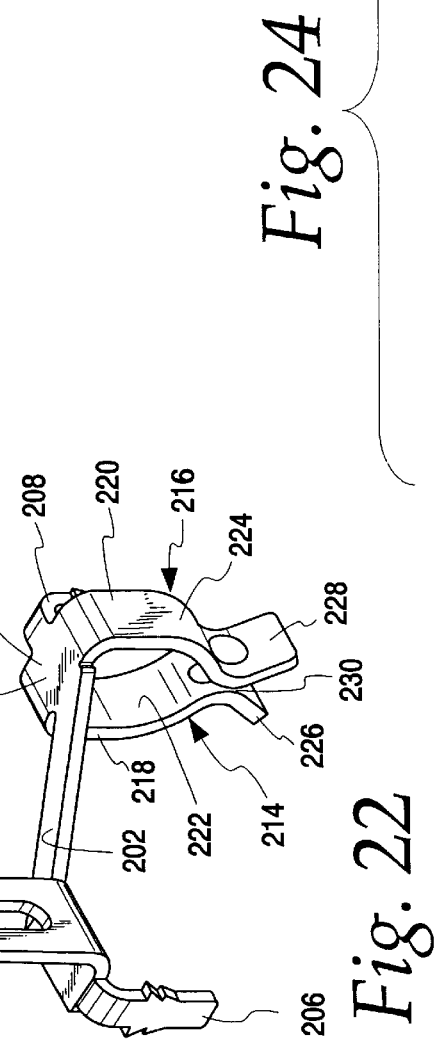
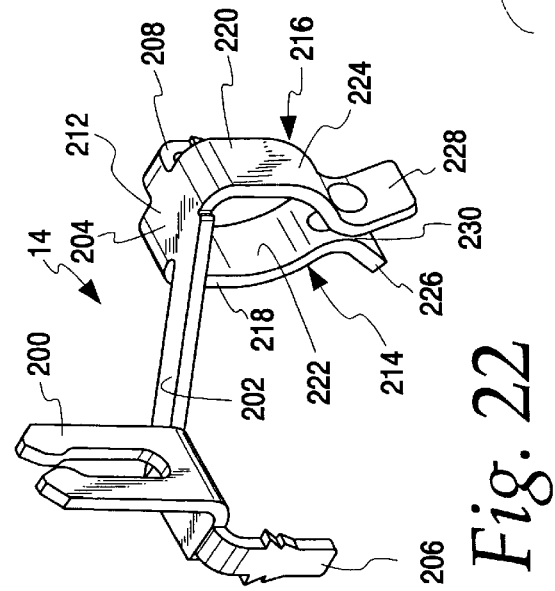
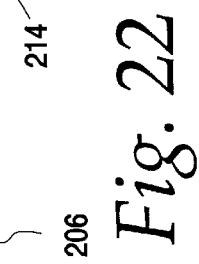

PURGE PROTECTION CARTRIDGE WITH THREE-WAY ATTACHMENT CLIP

BACKGROUND OF THE INVENTION

1. Field of the Invention

The present invention relates to a surge protection cartridge and more particularly to a stronger, more effective and more efficient surge protection cartridge.

2. Description of the Related Art

On a telephone line circuit, current flows into the telephone equipment on the tip lead and returns on the ring lead. Voltage is applied to the telephone line so that the current will flow through the telephone equipment. But when the line is subject to a foreign voltage such as by a lightning strike the telephone circuit may malfunction. Over-voltage/over-current protection is used in telecommunication networks to protect the network and those who use the network from injury due to high current/voltage surges. An important principle of electrical protection is to provide a low impedance path to ground for the foreign voltages. These protection devices are inserted into the circuit and when the voltage on the line at the protection device raises above a preset level, usually 200 to 600 volts, the device directs the current flow to ground until the high voltage is removed.

Surge protection cartridges have been in use in the telephony field to protect telephone circuits from electrical surges. Examples of such protection cartridges are found in U.S. Pat. Nos. 4,504,883; 5,627,721; 5,643,014; 5,923,238; 6,243,250; D 424,022 and European Application No. EP 0753907A2. Protection cartridges or modules such as that shown in U.S. Pat. No. 5,779,504 are, however, difficult to service, are limited in the use of types and brands of protection devices and are hard to assemble.

BRIEF SUMMARY OF THE INVENTION

The shortcomings of existing devices have been overcome by the present invention. What is described here is a surge protection cartridge for a modular terminal block assembly comprising a housing adapted to be connected to a modular terminal block; a plurality of electrical terminals mounted to the housing; a grounding element mounted to the housing; and an attachment clip mounted to the housing for connecting the housing to a frame and for connecting the housing to a terminal block assembly.

There are a number of advantages, features and objects achieved with the present invention which are believed not to be available in earlier related devices. For example, one advantage is that the surge protection cartridge is compact and usable in standard telecommunication frames. Another object of the present invention is to provide a surge protection cartridge that accommodates many types and brands of protection devices and allows their installation and removal by hand and without tools. A further feature of the present invention is to provide a surge protection cartridge which is rugged and robust, both mechanically and electrically. Yet another advantage of the present invention is to provide a surge protection cartridge which is safe and non-destructive, both to technicians working with modular terminal block assemblies and to other equipment such as the electrical wires connecting to the electrical terminals. Still another advantage of the present invention is the provision of a surge protection cartridge which is relatively simple, reliable and economical.

A more complete understanding of the present invention and other objects, advantages and features thereof will be gained from a consideration of the following description of the preferred embodiment read in conjunction with the accompanying drawing provided herein. The preferred embodiment described below represents an example of the invention in compliance with Title 35 U.S.C. section 112 (1$^{st}$ paragraph).

BRIEF DESCRIPTION OF THE SEVERAL VIEWS OF THE DRAWING

FIG. 1 is a partially exploded isometric view of a surge protection cartridge without surge protection devices.

FIG. 2 is a partially exploded isometric view of the surge protection device shown in FIG. 1 and including surge protection devices.

FIG. 5 is an upward looking isometric view of the housing of FIG. 4 partially broken away.

FIG. 6 is a top plan view of a portion of the housing taken within circle 6—6 of FIG. 4.

FIG. 7 is a bottom plan view of a portion of the housing taken within circle 7—7 of FIG. 5.

FIG. 8 is a sectional elevation view of the housing taken along line 8—8 of FIG. 4.

FIG. 9 is a sectional elevation view of the housing taken along line 9—9 of FIG. 4.

FIG. 9a is a sectional elevation view of the housing taken along line 9a—9a of FIG. 4.

FIG. 10 is a partial sectional elevation view of the housing taken along line 10—10 of FIG. 7.

FIG. 11 is a front isometric view of an attachment clip of the surge protection cartridge.

FIG. 12 is a rear isometric view of the attachment clip of the surge protection cartridge.

FIG. 13 is a sectional elevation view of the attachment clip taken along line 13—13 of FIG. 12.

FIG. 14 is a fragmentary isometric view of a standard telephony mounting frame.

FIG. 15 is an isometric view of a grounding element of the surge protection cartridge.

FIG. 18 is a top plan view of a portion of the guide strip taken within circle 18—18 of FIG. 16.

FIG. 19 is a sectional elevation view of the guide strip taken along line 19—19 of FIG. 16.

FIG. 20 is an upward looking isometric view of a cover of the surge protection cartridge.

FIG. 21 is a downward looking isometric view of the cover of the surge protection cartridge.

FIG. 22 is an isometric view of a tip terminal of the surge protection cartridge.

FIG. 23 is an isometric view of a ring terminal of the surge protection cartridge.

FIG. 24 is an isometric view, partially exploded, of a surge protection cartridge and an additional attachment clip.

DETAILED DESCRIPTION OF A PREFERRED EMBODIMENT OF THE INVENTION

Figure 3:
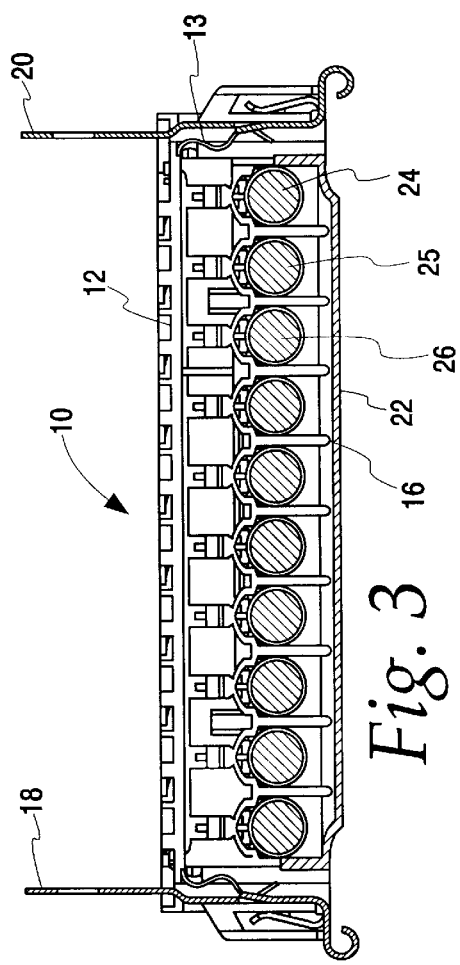
FIG. 3 is a sectional elevation view of the surge protection cartridge but without tip and ring terminals.
Figure 4:
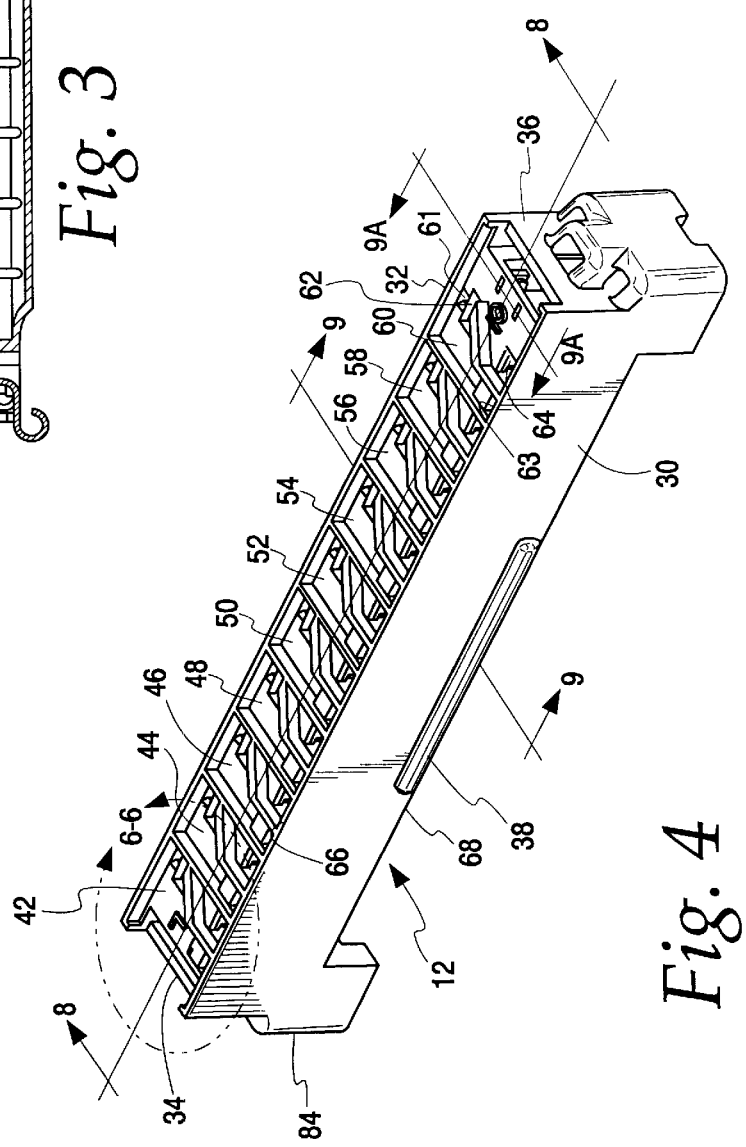
FIG. 4 is a downward looking isometric view of a housing of the surge protection cartridge.
Figure 16:
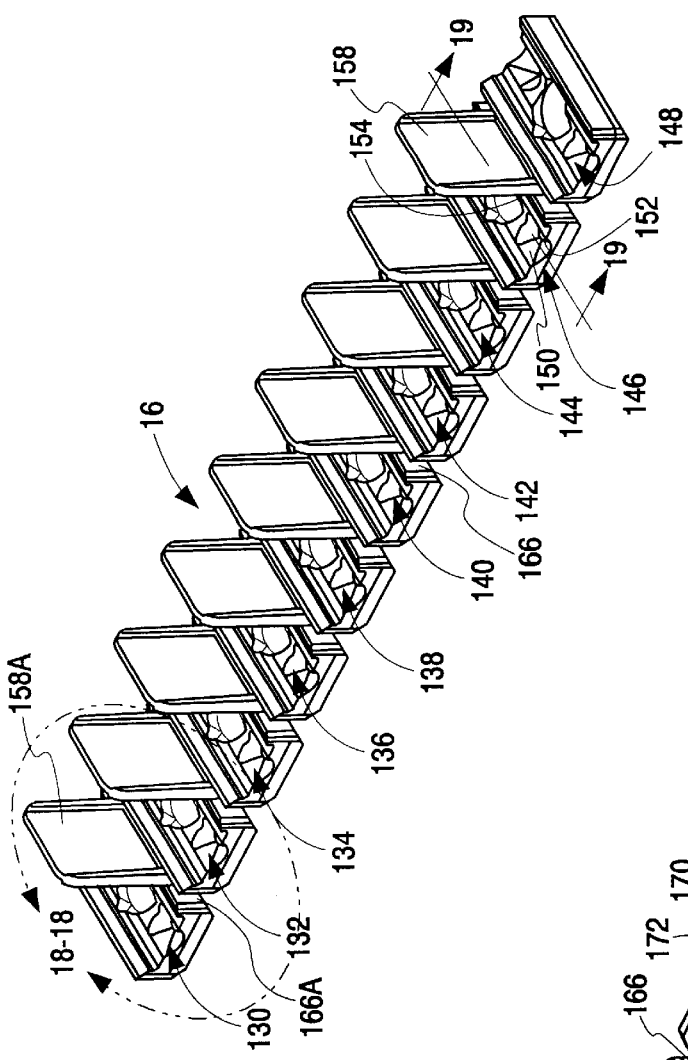
FIG. 16 is a downward looking isometric view of a guiding strip of the surge protection cartridge.
Figure 17:
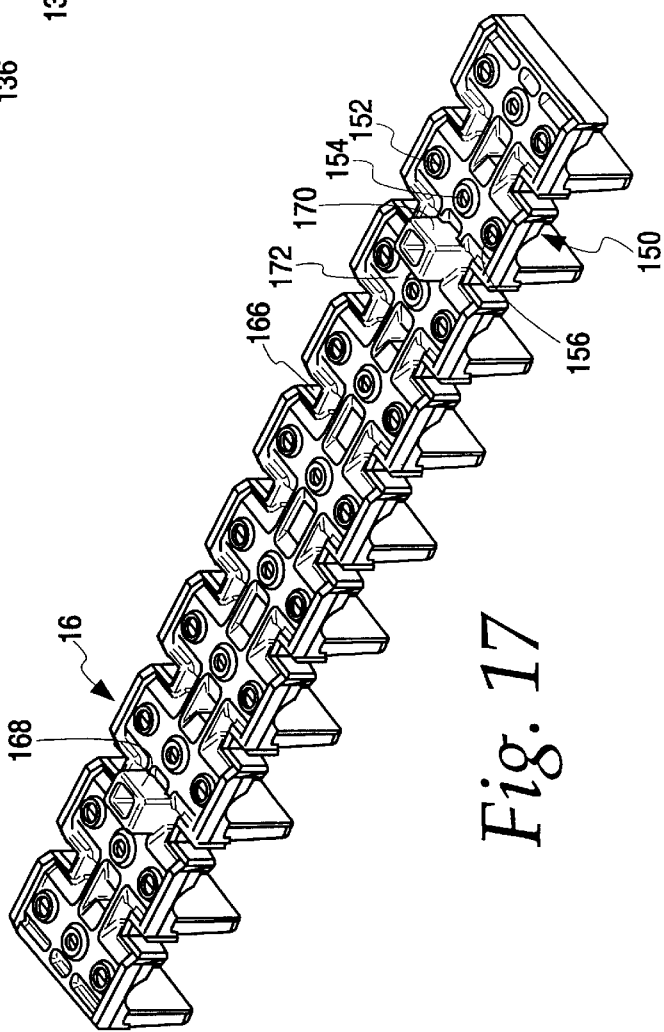
FIG. 17 is an upward looking isometric view of the guide strip of the surge protection cartridge.

While the present invention is open to various modifications and alternative constructions, the preferred embodiment shown in the drawing will be described herein in detail. It is understood, however, that there is no intention to limit the invention to the particular form or example disclosed herein. On the contrary, the intention is to cover all modifications, equivalent structures and methods, and alternative constructions falling within the spirit and scope of the invention as expressed in the appended claims as set forth in Title 35 U.S.C. §112 ($2^{nd}$ paragraph).

Referring to FIGS. 1, 2 and 3, an example of the invention in the form of a surge protection cartridge 10 is illustrated. The exploded isometric views of FIGS. 1 and 2 each shows a partial surge protection cartridge, as does the cross-sectional elevation view of FIG. 3 . However, when viewed together, FIGS. 1–3 shows all of the elements of the surge protection cartridge. The cartridge 10 includes a ten-pair housing 12, a grounding element 13, tip and ring terminals such as the terminals 14, 15, a guide strip 16, a pair of attachment clips 18, 20, a cover 22, and ten surge protection devices such as the over-voltage/over-current protection devices 24, 25, 26.

Referring now to FIGS. 4–10, the housing 12 is shown in more detail. The housing includes longitudinally directed, short height, side walls 30, 32 and end walls 34, 36. Opposing connection projections 38, 40 integral with the side walls 30, 32, respectively, are provided for making connection to the cover 22 as will be explained below. The housing is divided into ten compartments 42, 44, 46, 48, 50, 52, 54, 56, 58, 60, each of which includes a tip terminal opening such as the openings 62, 62a, 62b, and a ring terminal opening such as the openings 64, 64a, 64b. Retention openings 61, 61a, 61b, 63, 63a, are provided for the tip terminal, and retention openings 65, 65a are provided for the ring terminal as will also be explained below.

It is to be noted that the side walls 30, 32 are relatively short from a top edge 66 to a bottom edge 68. This shortness exposes the protection devices 24, 25, 26 as shown in FIG. 2, which provides a major advantage of the present invention, namely the ability to install and remove protection devices by hand and without the use of any tools.

The housing includes an interior top wall 70, FIG. 9, extending almost the entire longitudinal length of the housing for receiving the grounding element 12. The grounding element is frictionally engaged with the housing along two interior, longitudinally extending walls 71, 72. Each wall also includes a guide flange, 73, 74, FIG. 5, respectively, which is received in a corresponding notch 75, 76, FIG. 15, respectively, in the sides of the grounding element. The housing also includes two snap retainers 67, 69, FIG. 9a, which also engage the grounding element 13. Once the grounding element is mounted in the housing, it will remain mechanically and frictionally engaged until purposefully disengaged. There are also a series of interior ledges in the housing, such as the ledge 77, for abutting and positioning the guide strip 16 and side flanges, such as the flange 78, for guiding and frictionally engaging the guide strip. At the left portion of the housing is a sleeve 80 for receiving the first attachment clip 18 and at the right end portion of the housing is a sleeve 82 for receiving the second attachment clip 20. The left end portion includes an outer wall 84 with a notch 85, the end wall 34, and an inner wall 88. The attachment clip 18 is inserted between the end wall 34 and the inner wall 88 and frictionally engages the end wall 34. A disengagement handle extends through the notch 85 and beyond the outer wall 84.

The housing is constructed of an electrically insulative material such as polyester, and sold under the brand Valox DR-48, with a uniform wall thickness of about 0.05 inches. All of the just described elements may be made as an integrally molded part. The housing acts as a mount for the other elements of the surge protection cartridge as shown in FIGS. 1–3.

Referring now to FIGS. 11–13, the attachment clip 18 is shown in more detail. (The other attachment clip 20 is identical.) The attachment clip is a strip of metal formed with an upper portion 90 and a somewhat offset lower portion 92. Three flexible beams 94, 96, 98 are formed by two slots 100, 102 beginning in the upper portion 90 and extending through the lower portion 92. The upper portion 90 of the attachment clip includes a square opening 104 which may be used to connect the surge protection cartridge to a modular terminal block assembly. The outer beams 94, 98 include return-curve arm portions 106, 108 which are flexible enough to allow the attachment clip to make a frictional fit with the end wall 34 of the housing 12. The outer beams also include barbs 107, 109 for making a strong interference fit with the end wall 34 of the housing 12. The end wall is received between the lower portion 92 and the arm portions 106, 108. The arm portions flex and provide a biasing force normal to the end wall. The middle beam 96 includes a curlycue handle 110. The handle extends beyond the notch 85 in the outer wall 84 of the housing when the clip is attached. The middle beam 96 also includes a connector projection 112 formed to mate with a post-opening of a mounting frame typically used in telecommunication networks. The handle 110 may be pressed outwardly by a technician to disengage the connector projection 112 from the frame post.

The material of the attachment clip may be AISI 1050 steel, annealed, with a heat treatment to 42-48 HRC and then finished with black zinc iron phosphate and oil. The purpose of the attachment clip is to act as a three-way connector. First, the attachment clip connects itself to the housing. Second, the clip also connects the surge protection cartridge to a modular terminal block assembly and third, the clip connects the entire assembly, including the cartridge, to a standard mounting frame.

A standard metal mounting frame 114 is illustrated in FIG. 14. It exemplifies the frame or bracket of the type used in telecommunication networks. Modular terminal block assemblies which are used to make connections in such networks are mounted to the frame on opposing pairs of upstanding flanges or posts such as the posts 115, 116. Such frames may be seen in earlier U.S. Pat. Nos. 5,627,721 and 5,779,504. The surge protection cartridge 10 is also structured to be supported by a pair of posts. Each post has an opening such as the opening 117, and it is in this opening into which the connector projection 112 of the attachment clip 18 is received. Once received, an interference engagement with the frame is completed. To release the surge protection cartridge from the frame, a technician pulls the handles 110 outwardly. As will be explained below the post surface around the opening 117, and designated 118, is available for electrical contact with the grounding element 13. The ease of mounting the surge protection cartridge on a standard network frame highlights still another advantage of the present invention. The cartridge is compact, easily installed and removed from a standard frame, and requires no special tools. As space is always at a premium, no more is required by the new cartridge and yet a far more effective and efficient device is offered.

Referring now to FIG. 15, the grounding element 13 is illustrated in more detail. The grounding element or ground bar includes a bridge or spine portion 120, a pair of flexible spring contact ends 122, 123, each of the pair having two spring fingers 124, 125, and a series of paired ground clips, such as the ground clips 126, 127. The grounding bar may be made of Olin Brass phosphor bronze C510 formed from a strip approximately 0.020 inches in thickness with a post-plate electro tin over nickel over copper flash. Each of the paired ground clips make electrical contact with a corresponding ground lead from one of the ten protection devices, such as the devices 24, 25, 26. The spring contact ends 122, 123 in turn make contact with the mounting frame in the post region 118, FIG. 14. The bridge portion 120 is mounted to the housing between the interior walls 71, 72 and lies along the top wall 70.

Another advantage of the disclosed surge protection cartridge is that the attachment clip is not a required part of the ground circuit. Thus, the attachment clip does not need to be constructed to make good electrical contact with any other element. The design of the attachment clip may be focused solely on making a robust mechanical connection between the surge protection cartridge, the modular terminal block assembly and the mounting frame. It is the grounding element that is designed specifically for completing an electrical ground circuit between the surge protection devices and the mounting frame.

Yet another advantage of the present invention is that the open architecture allows the cartridge 10 to receive and use many different types and brands of surge protecting devices. The devices all fit in the cartridge without an effective increase in housing dimensions nor a loss of robustness. Referring now to FIGS. 16–19, the guide strip 16 is shown in more detail. The guide strip cooperates with the housing and is divided into ten separate receptor bays 130, 132, 134, 136, 138, 140, 142, 144, 146, 148, where each bay includes a pad such as the pads 150, 150a and each pad includes three openings such as the openings 152, 152a, 154, 154a, 156, 156a. Each pad is adjacent an upstanding partition, there being nine partitions alternating with the ten pads. The partitions, such as the partition 158, define a bay and separate the bays from one another. Bordering each of the three openings are slanted funnel-like surfaces 160, 160a, 162, 162a, 164, 164a. The funnel-like surfaces around the openings enhance insertion of the three-lead surge protection devices so as to minimize the likelihood of damage to the soft material leads of the devices. The funnel-like surfaces also allow faster protection device insertion since the surfaces direct the leads to the openings and to connections with the terminals.

Between each pad of the guide strip and aligned with each partition is a guide notch such as the guide notches 166, 166a. The guide notches receive the side flanges 78, FIG. 5, of the housing 12. The side flanges align, guide and provide frictional engagement for the guide strip. Also guiding, aligning and frictionally engaging the housing are two depending feet 168, 170 extending from a bottom surface 172 of the guide strip. The guide strip may be made out of any suitable electrically insulated material such as PBT and may be molded as an integral piece. The thickness of the guide strip is generally about 0.035 inches. Once the guide strip is installed, there is sufficient frictional force to retain it in position. Also when the surge protection devices are installed additional frictional engagements occur, between the leads of the devices and the tip, ring and ground terminals. Moreover once the cover 22 is snapped into place, the grounding element, the guide strip and the protection devices are quite secure, even when the cartridge is exposed to rough handling.

The purpose of the guide strip is to cradle the protection devices, to allow the ends of the protection devices to be gripped by the fingers of a technician and thereby allow installation and removal of the protection devices without tools. Further, the "open" design of the guide strip allows sufficient space for the receipt of different types and brands of protection devices, such as gas tubes and solid state devices, both with and without fail-safe mechanisms. For example, acceptable devices include those identified as Sankosha 3YVA-90J1F2, Suntech 3YP, Epcos (formerly Siemens) T83, Crydom (formerly Semitron) T10C220E, and the HTA DDP200C.

The robust cover 22 is shown in FIGS. 20 and 21. The cover includes a base 174, two side walls 176, 178 and two end tabs 180, 182. The base includes a depressed central portion 184. Each side wall includes an elongated slot 186, 188 for receiving the connector projections 38, 40, FIGS. 5 and 9, of the side walls of the housing 12. Four reinforcing ribs 190, 192, 194, 196 are also formed on the base and side walls. The cover may be formed of any suitable insulative material such as polyester and may be molded as an integral piece. Supplementally, the cover secures the protection devices, the guide strip and the grounding element from coming apart even when roughly handled.

A tip terminal or clip is illustrated in FIG. 22. The tip clip 14 includes a first contact portion 200, a second contact portion 204 and a spanning bridge portion 202 connecting the two contact portions. The tip clip also includes a first connector barb 206 and a second connector barb 208. The tip clip is supported on the top surface 210, FIG. 6 of the housing with the first contact being supported in an upright position, the second contact being received by the openings 62, 62a the first barb being received by the openings 63, 63a and the second barb being received by the openings 61, 61a. The second contact includes a base 212 and two extending arms 214, 216. The arms have first parallel portions 218, 220, second converging portions 222, 224 and third diverging portions 226, 228. A contact region 230 is formed at the junction of the converging and diverging portions. The opening 62 in the housing is surrounded by walls 232, 234, FIG. 10, having a depth about equal in measurement to the length of the first portions of the arms. When the tip clip is mounted to the housing, the outer surfaces of the first portions 218, 220 are closely spaced from the walls 232, 234. A suitable spacing between each wall and a first arm portion is 0.001 inches. This arrangement has been found to stiffen the arms when they are exposed to a foreign voltage. By stiffening the arms there is less likely to be arcing and physical damage to the tip clip under "blow-off" conditions. A more complete description of the tip clip may be found in (co-pending application Ser. No. 10/114,138 entitled "Electrical Terminal For Surge Protection Cartridge"). The disclosure in the referenced patent is by reference.

The ring terminal or clip 15 is illustrated in FIG. 23. The ring clip includes a base portion 240, a first contact portion 242 and a second contact portion 244. The ring clip also includes a connector barb 246. The second contact portion 244 is disposed to fit into the openings 64, 64a, 64b of the housing while the barb 246 fits within the openings 65, 65a.

The tip and ring clips are formed of Olin Brass C 7025 phosphor bronze, having a thickness of 0.020 inches with a post-plate electro-tin over nickel over copper flash. The tip and ring clips form part of the electrical circuit which connects to insulation displacement connectors in the terminal block assembly.

Once all of the elements of the surge protection cartridge are formed including the housing 12, the grounding element 13, the tip and ring clips 14, 15, the guide strip 16, the cover 22 and the attachment clips 18, 20, the surge protection cartridge may be assembled by inserting the tip and ring clips into the housing, by placing the grounding element into the housing so as to have the spine portion 120 of the grounding element located at the interior wall 70 of the housing. Thereafter the guide strip may be inserted. Surge protection devices such as the devices 24, 25, 26 may be easily inserted by hand. Leads from the devices are funneled into the openings in the pads of the guide strip. The cover 22 is placed over the surge protection devices so that the slots in the cover receive the projections on the housing. An interference fit is established after the side walls of the cover yield to the projections and then snap into place when the slots and projections are aligned.

In operation the surge protection cartridge may be engaged with a mounting frame simply by inserting opposing posts 115, 116 of the frame 114 into the end portion sleeves 80, 82 of the cartridge, and between the attachment clips 18, 20 and the spring fingers 122, 124 of the grounding element 13. When this is accomplished a good mechanical engagement is made between the mounting frame and the attachment clips by way of the interference fit between the projection 112 of the attachment clip and the material surrounding the opening 117 of the posts. In addition, a good electrical contact is formed between the spring fingers of the grounding element and the region 118 of the mounting frame posts.

Referring to FIG. 24, a protection cartridge 10a is illustrated as are two additional rod clips 250, 252. Each clip has an upper portion 254 for connecting to the attachment clip 20a in the same way that a post from a mounting frame makes a connection. Each clip also includes a curved lower portion 256 for making engagement with a rod mounting (not shown here, but shown in U.S. Pat. No. 5,779,504 and incorporated here by reference), also found in telecommunication networks. Another connection may also be made between the surge protection cartridge 10, 10a and a modular terminal block assembly by having the block assembly engage the extending upper portions 90 of the attachment clips which closely resemble the posts of the mounting frame. The modular terminal block assembly engages the attachment clips in the same way that the block assembly might directly attach itself to the mounting frame. Namely, each block assembly includes opposing yieldable projections which snap into the openings in the mounting frame posts.

Should there be a need to replace surge protection devices or disengage the full assembly from the frame, the handle 110 of each attachment clip is pulled outwardly from the cartridge to release the projections from the openings in the posts of the mounting frame. The cover may then be removed to access the protection devices to be replaced. It is noted that this entire operation may be accomplished by hand without the use of any kind of tool. This feature occurs because of the design of the attachment clips and the housing and with the help of the guide strip. They allow the fingers of a technician to be used to separate the cartridge from the mounting frame, to separate the cover from the housing and to remove the protection devices from the housing. The housing, guide strip arrangement and the cover provide a more universal socket as many different types of surge protection devices may be used in the cartridge.

The cartridge is rugged and robust, both mechanically and electrically. The cartridge may be slightly more expensive to manufacture than some earlier devices, however, the cartridge is much easier to use. Not only are tools not required but the soft leads from surge protection devices are not as likely to be damaged during insertion, as is the case with prior related devices. Furthermore, the cartridge is safe both for technicians using the cartridge and for the numerous conductors which connect to modular terminal blocked assemblies. The cartridge is easy to mount to a connector, it provides secure and safe mounting of the protection devices while providing easy replacement, it allows access for jumper wire termination parts, it maintains ground for proper operation, it survives lighting discharges and power cross events, and it allows easy mounting to a rigid structure, such as the mounting frame. Overall the cartridge is relatively simple, very reliable and economical.

The portion of the above specification describes in detail a preferred embodiment of the present invention. Other examples, embodiments, modifications and variations will under both the literal claim language and the doctrine of equivalents come within the scope of the invention defined by the appended claims. For example, what has been disclosed is a ten-pair cartridge. It is to be understood that larger and smaller cartridges, that is having more or less pairs, are considered equivalent structures and will also come within the literal language of the claims. Still other alternatives will also be equivalent as will many new technologies. There is no desire or intention here to limit in any way the application of the doctrine of equivalents nor to limit or restrict the scope of the invention.

What is claimed is:

1. A surge protection cartridge for a modular terminal block assembly comprising:
   a housing adapted to be connected to a modular terminal block assembly;
   a plurality of electrical terminals mounted to said housing;
   a grounding element mounted to said housing; and
   an attachment clip mounted to said housing for connecting said housing to a frame and for connecting said housing to a terminal block assembly.

2. An apparatus as claimed in claim 1 wherein:
   said attachment clip includes a first element for connecting said clip to said housing;
   a second element for connecting said surge protection cartridge to said modular terminal block assembly; and
   a third element for connecting said clip to a frame.

3. An apparatus as claimed in claim 2 wherein:
   said first element includes a spring biased arm for frictionally engaging a wall of said housing and a barb for mechanical interference with said wall of said housing;
   said second element includes an upper portion with an opening, said opening adapted to receive an engagement projection of said modular terminal block assembly; and
   said third element includes an engagement projection located in a second portion of said clip.

4. An apparatus as claimed in claim 1 wherein:
   said housing includes short side walls wherein surge projection devices mounted to said housing are sufficiently exposed to be inserted and removed by hand.

5. An apparatus as claimed in claim 4 including:
   a guide strip mounted to said housing, said guide strip including a plurality of spaced apart partitions alternating with a plurality of surge protection device receiving pads.

6. An apparatus as claimed in claim 5 wherein:
   each of said pads includes three spaced apart openings.

7. An apparatus as claimed in claim 6 wherein:
   each of said pads includes slanted surfaces bordering each of said openings.

8. An apparatus as claimed in claim 1 including:

a guide strip mounted to said housing and adapted to receive a plurality of surge protection devices which make electrical contact with said grounding element and with said tip and ring terminals.

9. An apparatus as claimed in claim 8 wherein:

said guide strip includes a plurality of spaced apart partitions separated by a plurality of surge protection device receiving pads; and each of said pads includes three spaced apart openings.

10. An apparatus as claimed in claim 9 wherein:

each of said pads includes a slanted surface bordering each of said openings.

11. An apparatus as claimed in claim 1 wherein:

said grounding element includes an elongated spine, a plurality of contacts extending from said spine and two pair of spring biased electrical contacts, one pair at each end of said spine.

12. An apparatus as claimed in claim 11 wherein:

said grounding element and said attachment clip are non-integral.

13. An apparatus as claimed in claim 1 including:

a cover for removably mounting to said housing, said cover includes a base and opposing side walls, and each of said walls having a projection receiving slot; and said housing includes side walls where each side wall includes an engagement projection.

14. An apparatus as claimed in claim 5 wherein:

said attachment clip includes a first element for connecting said clip to said housing;

a second element for connecting said surge protection cartridge to said modular terminal block assembly; and a third element for connecting said clip to a frame.

15. An apparatus as claimed in claim 14 wherein:

said first element includes a spring biased arm for frictionally engage a wall of said housing and a barb for mechanical interference with said wall of said housing;

said second element includes an upper portion with an opening, said opening for receiving an engagement projection of said modular terminal block assembly; and said third element includes an engagement projection in a second portion of said clip.

16. An apparatus as claimed in claim 14 wherein:

said grounding element includes an elongated spine, a plurality of contacts extending from said spine and spring biased electrical contacts connected at each end of said spine.

17. An apparatus as claimed in claim 1 including:

a guide strip mounted to said housing, said guide strip including a plurality of spaced apart partitions alternating with a plurality of surge protection device receiving pads wherein each of said pads includes three spaced apart openings;

each of said pads includes slanted surfaces bordering each of said openings;

said attachment clip includes a first element for connecting said clip to said housing, a second element for connecting said surge protection cartridge to said modular terminal block assembly and a third element for connecting said clip to a frame;

said first clip element including a spring biased arm for frictionally engaging a wall of said housing and a barb for mechanical interference with said wall of said housing, said second clip element includes an upper portion with an opening, and said third clip element includes an engagement projection; and said grounding element includes an elongated spine, a plurality of contacts extending from said spine and spring biased electrical contacts connected at each end of said spine.

18. An apparatus as claimed in claim 17 including:

a cover for removably mounting to said housing;

said cover includes a base and opposing side walls, each of said side walls having a projection receiving slot;

said housing includes side walls, where each side wall includes an engagement projection; and said housing includes short side walls wherein mounted surge protection devices are sufficiently exposed to be inserted and removed by hand.

* * * * *

UNITED STATES PATENT AND TRADEMARK OFFICE
CERTIFICATE OF CORRECTION

PATENT NO.    : 6,556,411 B1  
DATED         : April 29, 2003  
INVENTOR(S)   : Daniel Hoeft et al.

It is certified that error appears in the above-identified patent and that said Letters Patent is hereby corrected as shown below:

<u>Title page,</u>  
Item [54], Title, replace "PURGE" with -- SURGE --;

<u>Column 2,</u>  
Line 33, replace "1O-10" with -- 10-10 --; and

<u>Column 6,</u>  
Line 52, replace "patent" with -- patent application --.

Signed and Sealed this

Twenty-first Day of June, 2005

JON W. DUDAS  
*Director of the United States Patent and Trademark Office*